July 18, 1950     W. R. PAGE     2,515,731
HEATING OVEN FOR LAMINATED GLASS
Filed Aug. 19, 1947     2 Sheets-Sheet 1
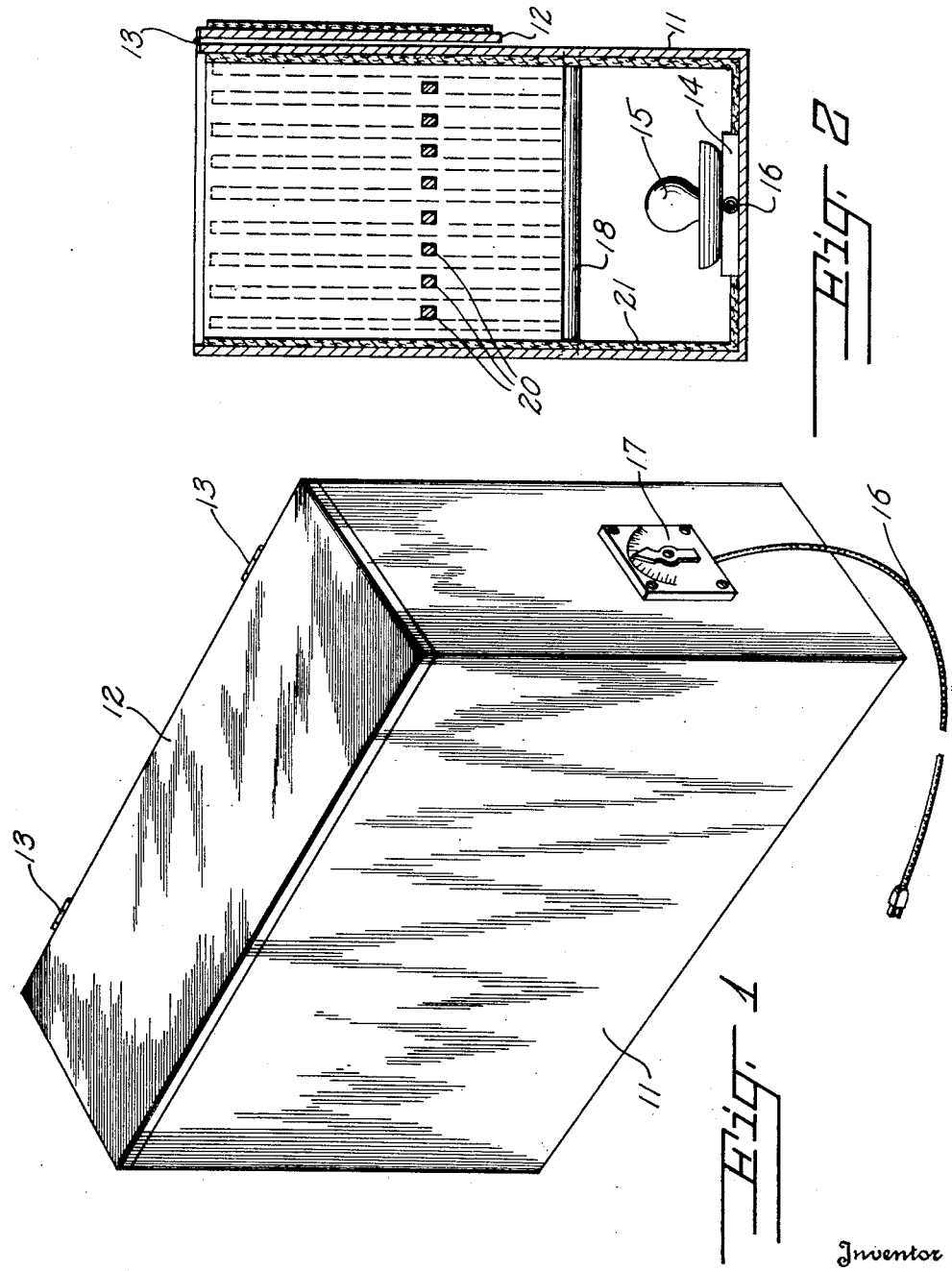
Inventor
Walter R. Page
By McMorrow, Berman + Davidson
Attorney July 18, 1950

W. R. PAGE 2,515,731

HEATING OVEN FOR LAMINATED GLASS

Filed Aug. 19, 1947

Inventor
Walter R. Page

By
McMorrow, Berman & Davidson
Attorneys

Patented July 18, 1950

2,515,731

UNITED STATES PATENT OFFICE 2,515,731

HEATING OVEN FOR LAMINATED GLASS

Walter R. Page, Carpinteria, Calif.

Application August 19, 1947, Serial No. 769,392

2 Claims. (Cl. 219—35)

This invention relates to heating ovens, and more particularly to an oven for heating laminated glass to soften the center lamination in the glass so that the glass may be easily cut.

A main object of the invention is to provide a novel and improved heating oven for laminated glass which is very simple in construction, compact in size and efficient in operation.

A further object of the invention is to provide an improved oven for heating laminated glass preparatory to cutting, said oven being inexpensive to manufacture, rugged in construction and having a large capacity yet being relatively small in bulk.

Further objects and advantages of the invention will become apparent from the following description and claims, and from the accompanying drawings, wherein:

Figure 1 is a perspective view of a laminated glass heating oven constructed in accordance with the present invention.

Figure 2 is a transverse vertical cross-sectional view taken through the heating oven of Figure 1 with the top lid shown in open position, said view being taken on line 2—2 of Figure 4.

Figure 3:
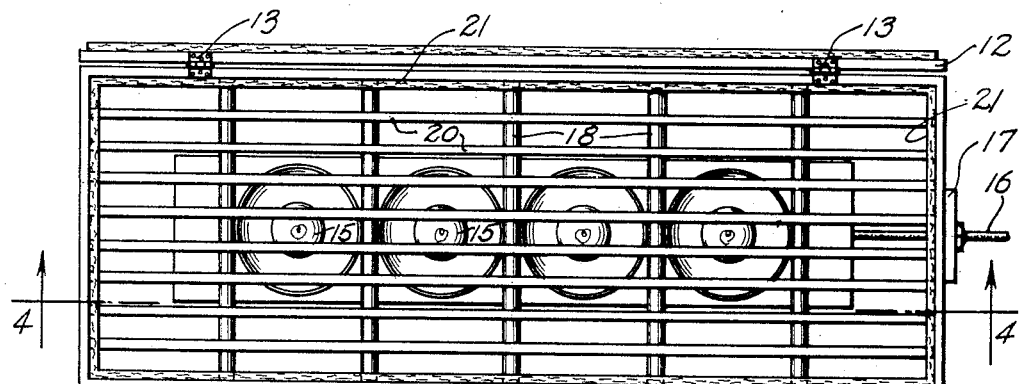
Figure 3 is a top plan view of the heating oven with the top lid in open position.
Figure 4:
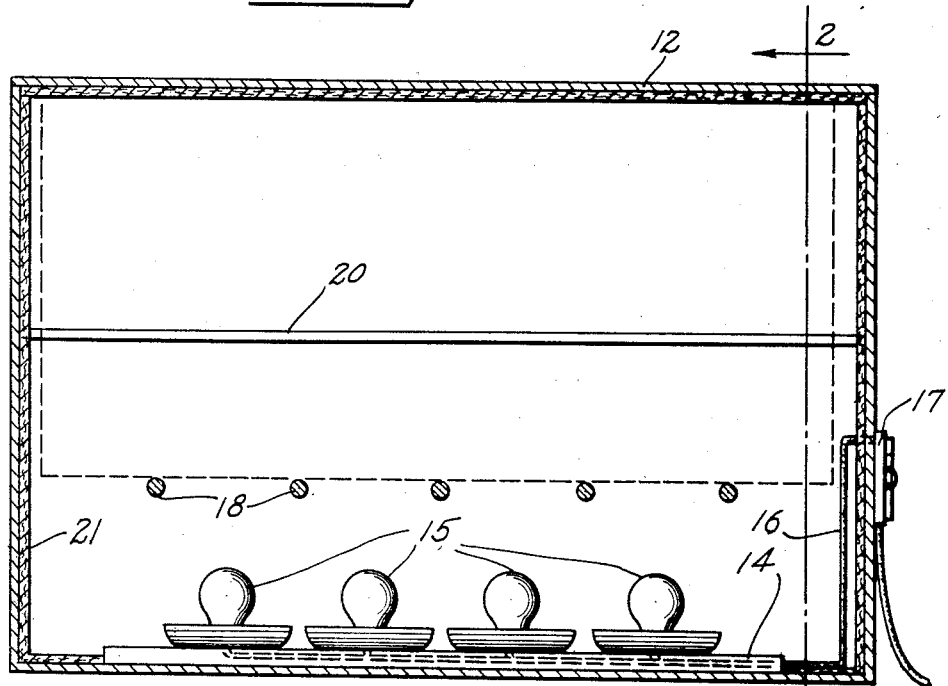
Figure 4 is a vertical longitudinal cross-sectional view taken on line 4—4 of Figure 3, with the top lid of the oven in closed position.

Referring to the drawings, 11 designates a rectangular housing constructed of sheet metal, plywood or the like, having a top lid 12 hinged to the top edge of a longitudinal wall of the housing at 13, 13.

Mounted in the bottom of the housing on an insulating, heat-resistant block 14 are a plurality of heating units 15, such as infra-red lamps. The lamps 15 are connected by a line cord 16 through an adjustable thermostatic switch device 17 mounted on an end wall of housing 11, to a suitable source of energizing current. Switch device 17 is mounted externally on said end wall and is manually adjustable to provide a desired operating temperature inside the housing.

Secured transversely in the lower portion of the housing are a plurality of longitudinally spaced supporting rods 18 of any suitable material, such as hard wood, or the like, said rods 18 being adapted to support laminated glass sheets, such as shown in dotted view at 19 at their bottom edges, the sheets being positioned vertically in the housing. Secured longitudinally in the housing above the transverse rods 18 are a plurality of transversely spaced spacer-bars 20 between which adjacent glass sheets are positioned and by means of which the sheets are supported vertically on the transverse rods 18.

The interior of the housing and the bottom of lid 12 are lined with suitable heat resisting material, such as sheet asbestos, shown at 21.

In operation, the sheets of glass to be heated are first cut on both sides and are then inserted lengthwise between the longitudinal spacer bars 20 and rest on the transverse supporting rods 18. The glass is left in the oven until it is thoroughly heated and is then removed. The center filler lamination is thus softened so that it may be cut with a sharp tool such as a razor blade. After the center lamination is cut the severed pieces of the glass sheets may be separated.

The housing 11 may be made of any suitable size in accordance with the size of the laminated glass sheets to be heated.

The top of the oven provides a convenient support on which the glass sheets may be laid to sever their center filler laminations, as above described, after heating.

The oven may be also employed to soften the packing in the window channels of broken automobile window panes to facilitate the removal of said channels from said window panes.

An alternate procedure in cutting sheets of glass would be to first heat the sheets in the oven for a period of time sufficient to soften the filler material between the glass segments of the sheets, then remove the sheets and cut the upper glass segments of each sheet with a glass cutter. The filler material between the sheets is then cut with a sharp tool and the lower glass segments are then cut with the glass cutter. The severed parts of the sheet may then be separated.

While a specific embodiment of an oven for heating laminated glass prior to cutting has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A heating oven for heating a laminated glass sheet preparatory to cutting comprising a housing provided with an open end, a cover for closing the open end of said housing, a longitudinally-extending insulating block secured in the bottom of said housing, a plurality of longitudinally-spaced infra-red electrical heating units mounted on said insulating block, an energizing circuit for said heating units, a manually thermostatic switch mounted on a wall of said housing and included in said energizing circuit, a plurality of longitudinally-spaced transverse rods secured to the housing side walls above said heating units, and a plurality of transversely-spaced longitudinal bars secured to the housing end walls above the transverse rods, said transverse rods being adapted to support the bottom edges of laminated glass sheets positioned between adjacent spaced longitudinal bars.

2. A heating oven for heating laminated glass sheets preparatory to cutting, comprising a rectangular housing provided with a hinged top cover, a longitudinally extending insulating block secured in the bottom of the housing, a plurality of longitudinally spaced infra-red electrical heating units mounted on said insulating block, an energizing circuit for said heating units, a manually adjustable thermostatic switch mounted on a wall of the housing and included in said energizing circuit, a plurality of longitudinally spaced transverse rods secured to the housing side walls above said heating units, and a plurality of transversely spaced longitudinal bars secured to the housing end walls above the transverse rods, said transverse rods being adapted to support the bottom edges of laminated glass sheets positioned between adjacent spaced longitudinal bars.

WALTER R. PAGE.

REFERENCES CITED

The following references are of record in the file of this patent:

UNITED STATES PATENTS

| Number | Name | Date |
|---|---|---|
| 1,276,317 | Blagen | Aug. 20, 1918 |
| 1,294,269 | Hopkins | Feb. 11, 1919 |
| 1,408,308 | Rhodes | Feb. 28, 1922 |
| 2,291,451 | Craig et al. | July 28, 1942 |
| 2,360,026 | Wall | Oct. 10, 1944 |
| 2,419,643 | Hudson | Apr. 29, 1947 |